US011077750B2

(12) United States Patent
Sundberg et al.

(10) Patent No.: US 11,077,750 B2
(45) Date of Patent: Aug. 3, 2021

(54) OFF-ROAD UTILITY VEHICLE

(71) Applicant: Arctic Cat Inc., Thief River Falls, MN (US)

(72) Inventors: Zachary John Sundberg, Wyoming, MN (US); Doug Grangroth, Big Lake, MN (US); Dustin Keller, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 221 days.

(21) Appl. No.: 16/033,973

(22) Filed: Jul. 12, 2018

(65) Prior Publication Data

US 2019/0016216 A1 Jan. 17, 2019

Related U.S. Application Data

(60) Provisional application No. 62/531,839, filed on Jul. 12, 2017.

(51) Int. Cl.
*B60K 17/34* (2006.01)
*B60K 17/36* (2006.01)
(Continued)

(52) U.S. Cl.
CPC .............. *B60K 17/34* (2013.01); *B60K 17/22* (2013.01); *B60K 17/36* (2013.01); *B60K 23/08* (2013.01);
(Continued)

(58) Field of Classification Search
CPC ........ B60K 17/34; B60K 17/22; B60K 23/08; B60K 17/36; B60K 23/0808;
(Continued)

(56) References Cited

U.S. PATENT DOCUMENTS 2,299,006 A * 10/1942 Brown ................... B60K 17/36
180/24.11
3,378,095 A * 4/1968 Sons, Jr. ................ B60K 17/36
180/356

(Continued)

FOREIGN PATENT DOCUMENTS

EP 1090799 A2 4/2001
GB 2353337 B 12/2003

OTHER PUBLICATIONS

"2003 Jeep Rubicon—Specifications & Review—Four Wheeler Magazine", http://www.fourwheeler.com/vehicle-reviews/2003-jeep-rubicon-review/, 2003, 1-11.
(Continued)

*Primary Examiner* — Frank B Vanaman
(74) *Attorney, Agent, or Firm* — Billion & Armitage

(57) ABSTRACT

An off-road utility vehicle includes a frame, an engine, a continuously variable transmission, a transaxle comprising a rear differential, an intermediate drive assembly comprising an intermediate differential, and a front drive assembly comprising a front differential. The intermediate drive assembly and transaxle are coupled via an intermediate driveshaft and the front drive assembly and the intermediate drive assembly are coupled via a front drive shaft. The front drive shaft and the intermediate drive shaft are counter rotating.

17 Claims, 14 Drawing Sheets

(51) Int. Cl.
    *B62D 61/10*     (2006.01)
    *F16H 48/05*     (2012.01)
    *F16H 48/20*     (2012.01)
    *B60K 23/08*     (2006.01)
    *B60K 17/22*     (2006.01)
    *B60K 5/00*     (2006.01)
    *B60K 23/04*     (2006.01)

(52) U.S. Cl.
    CPC .......... *B60K 23/0808* (2013.01); *B62D 61/10* (2013.01); *F16H 48/05* (2013.01); *F16H 48/20* (2013.01); *B60K 2005/003* (2013.01); *B60K 2023/046* (2013.01); *B60K 2023/0891* (2013.01); *B60Y 2200/20* (2013.01); *B60Y 2400/72* (2013.01)

(58) Field of Classification Search
    CPC ........ B60K 2005/003; B60K 2023/046; B62D 61/10; F16H 48/05; F16H 48/20; B60Y 2400/72
    USPC ................. 180/24.09, 24.1, 24.11, 24.12
    See application file for complete search history.

(56) References Cited

U.S. PATENT DOCUMENTS

| | | | |
|---|---|---|---|
| 6,432,020 B1 | 8/2002 | Rivera et al. | |
| 6,629,699 B2 * | 10/2003 | Hurlburt | B60G 9/02 180/22 |
| 6,634,978 B2 | 10/2003 | Banno et al. | |
| 6,820,712 B2 | 11/2004 | Nakamura | |
| 6,976,553 B1 | 12/2005 | Dahl et al. | |
| 7,018,317 B2 | 3/2006 | Tweet et al. | |
| 7,306,536 B2 * | 12/2007 | Ziech | B60K 17/36 180/24.09 |
| 8,725,376 B2 | 5/2014 | Murota et al. | |
| 8,771,140 B2 | 7/2014 | McCann et al. | |
| 8,827,025 B2 | 9/2014 | Hapka | |
| 9,358,882 B2 | 6/2016 | Hapka | |
| 9,555,702 B2 | 1/2017 | Olli | |
| 2001/0004031 A1 * | 6/2001 | Hasegawa | B60K 17/34 180/400 |
| 2009/0071737 A1 * | 3/2009 | Leonard | B60N 3/023 180/68.4 |
| 2011/0024222 A1 | 2/2011 | Honzek | |
| 2016/0144922 A1 * | 5/2016 | Olli | B62J 1/00 180/22 |

OTHER PUBLICATIONS

"Jeep TJ Wrangler locking diffs", 2004, 1-299.
"Mercedes—Benz G—Class Operator's Manual", 2002, 1-385.
"ROCKCRAWLER.com eaton ELocker Preview", http://www.rockcrawler.com/techreports/eaton_elocker_preview/index.asp, 1-2.
"Mercedes Benz G500 Wagon—Four Wheeler Magazine", http://www.fourwheeler.com/project-vehicles/129-0204-usa-mercedes-be, 1-11.

* cited by examiner

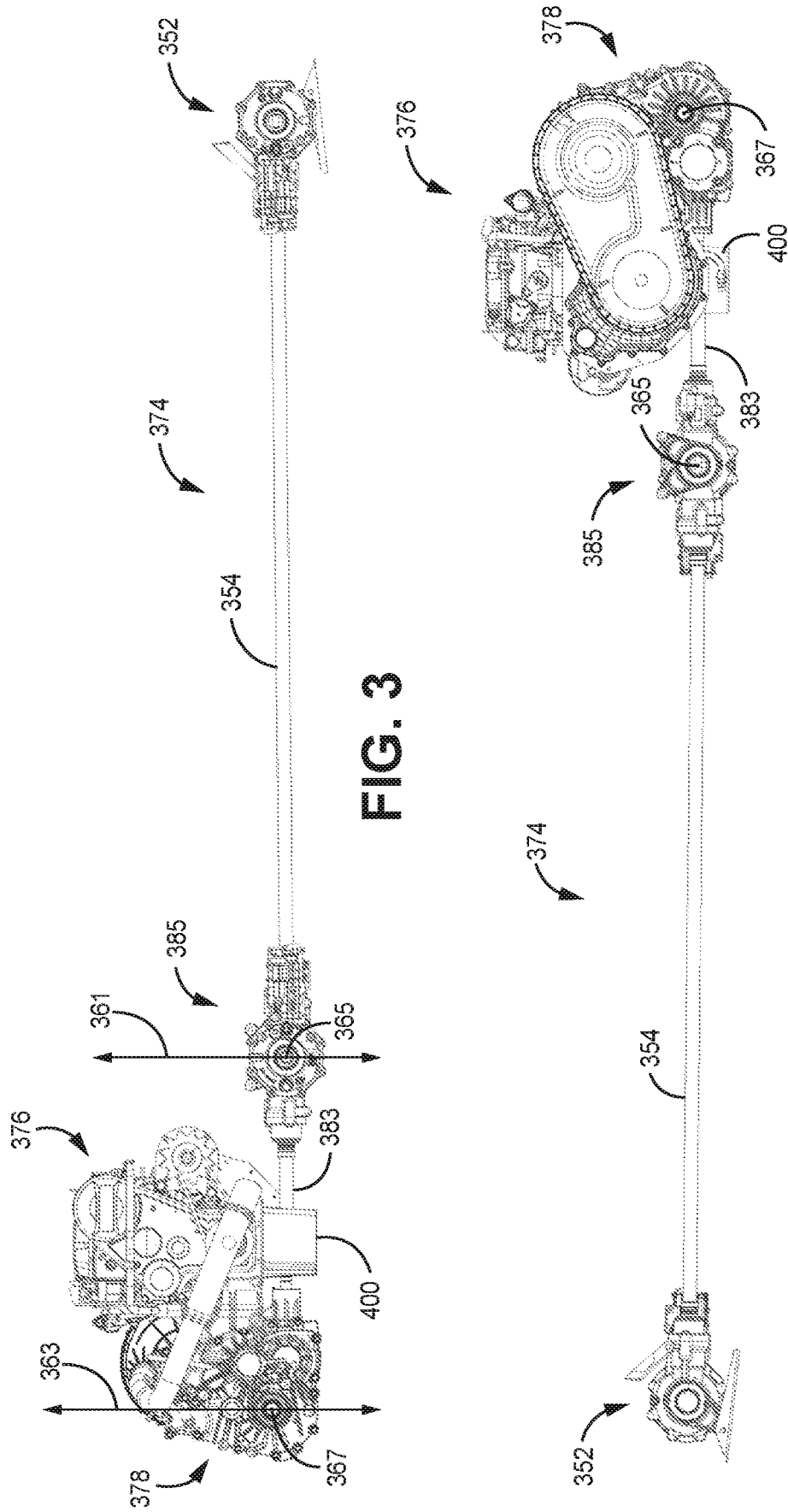

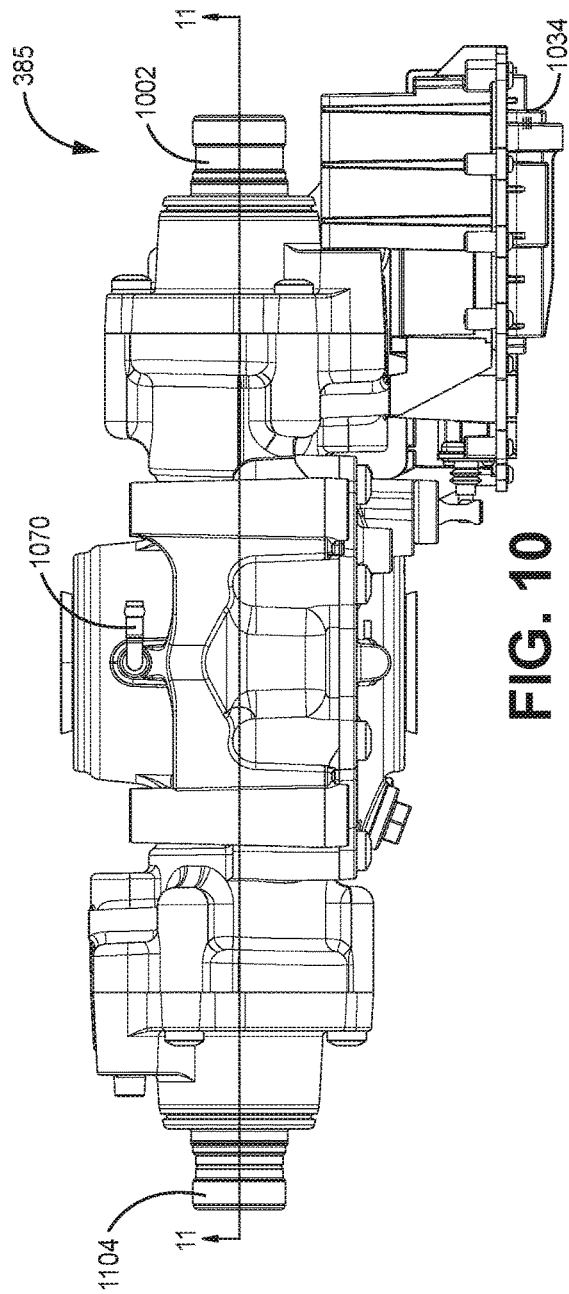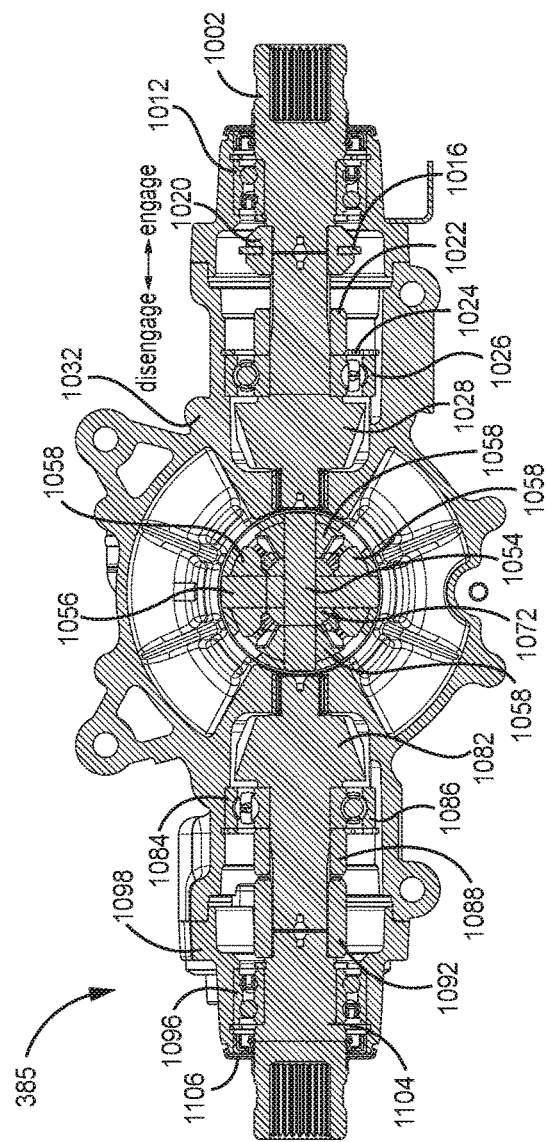
FIG. 10
FIG. 11

OFF-ROAD UTILITY VEHICLE

CROSS-REFERENCE TO RELATED APPLICATION(S)

This application claims priority to U.S. Provisional Application No. 62/531,839, filed Jul. 12, 2017; titled "OFF-ROAD UTILITY VEHICLE", the disclosure of which is incorporated by reference in its entirety.

BACKGROUND

Recreational off-highway vehicles ("ROVs") are quite capable in a wide variety of riding environments and situations, whether for sport or utility purposes. The ability of the vehicles to carry multiple occupants makes them socially enjoyable to ride as well. The vehicles can be easy to enter and exit and easy to operate with controls and ergonomics somewhat similar to automobiles. However, unlike most automobiles, ROVs can be driven on harsh off-road terrain. The extent to which such terrain can be accessed depends on multiple factors, including the vehicle width, suspension, turning radius, under-carriage clearance, wheelbase, center of gravity, and power. The arrangement of these aspects and their interrelations can be important in determining the occupant ride characteristics, reliability, ease of maintenance, and terrain and cargo capabilities of the ROV.

ROVs commonly have four wheels, although it some environments it may be desirable to have additional traction/wheel components.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIGS. 3 and 4 are first and second side views, respectively, of the driveline without axles according to some embodiments.

FIG. 10 is a top view of the differential according to some embodiments.

FIG. 11 is a cross-sectional view of the differential taken along line 11-11 shown in FIG. 10 according to some embodiments.

DETAILED DESCRIPTION

In some embodiments, a utility vehicle, such as a recreational off-highway utility vehicle is shown. The contents of U.S. application Ser. No. 15/927,524, filed Mar. 21, 2018; titled "OFF-ROAD UTILITY VEHICLE"; are herein incorporated by reference. Although application Ser. No. 15/927,524 discloses, in at least some embodiments, features in the context of a four-wheeled vehicle, such features (e.g., frame, CVT, suspension, steering, seating, etc.) are, in at least some embodiments, applicable to the immediate disclosure. By way of example, embodiments of application Ser. No. 15/927,524 can be utilized with a vehicle having six (or more) wheels. Again by way of example, in some embodiments, the vehicle has a rear set and an intermediate set of axles located beneath a cargo box (e.g., dump box) and a front set of axles located forward of an operator area. The contents of U.S. Pat. No. 7,018,317, to Tweet and Stenvik, are also herein incorporated by reference.

Figure 1:
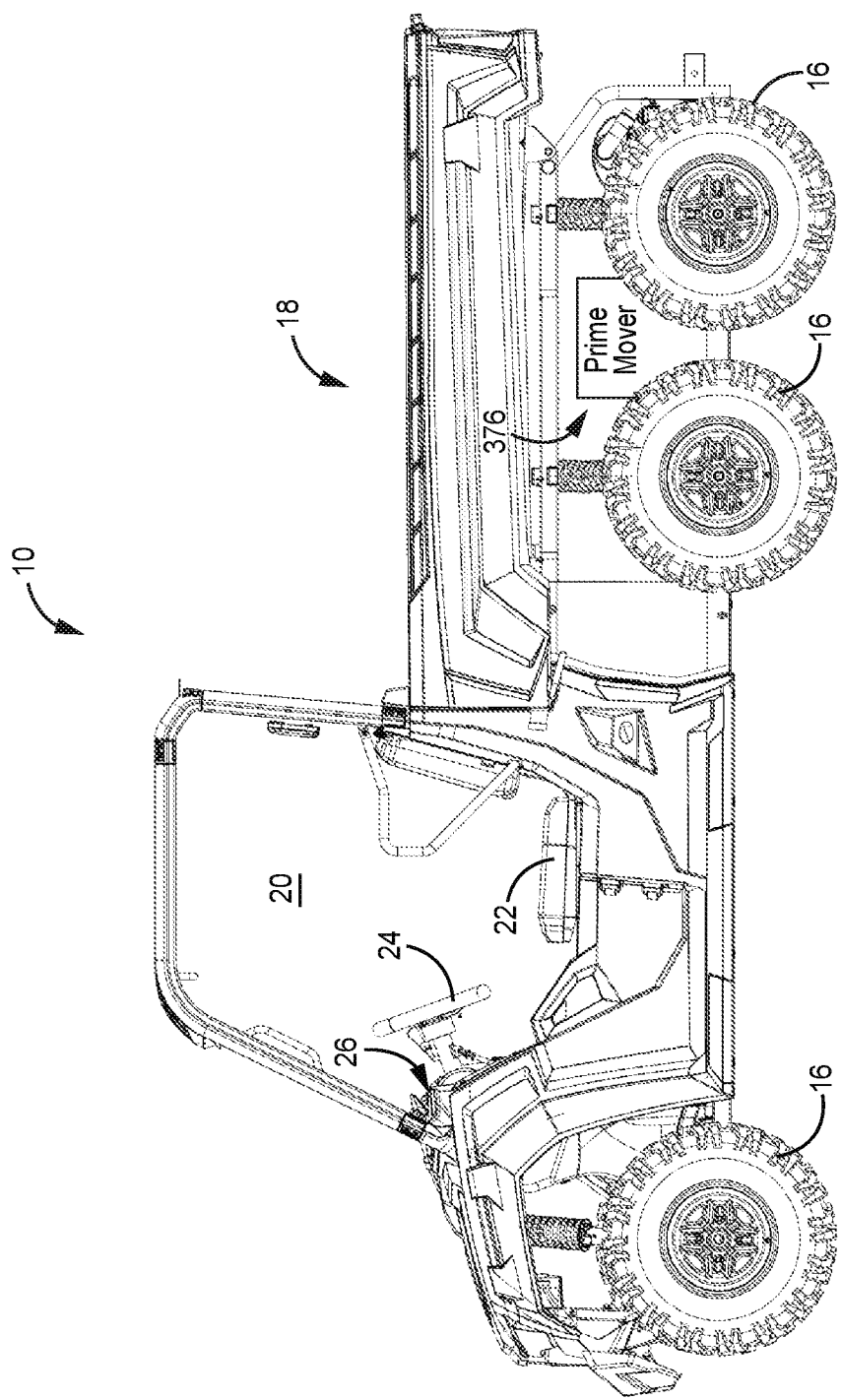
FIG. 1 is a side view of the off-road utility vehicle according to some embodiments.

As illustrated in FIG. 1, in some embodiments, a utility vehicle 10 comprises a plurality of ground engaging members 16 (e.g., tires). In some embodiments, the utility vehicle 10 has six or more ground engaging members 16 and, in some embodiments, one, two, three, four, five, or all six of the ground engaging members 16 can be selectively engaged to propel the utility vehicle 10. In the embodiment shown in FIG. 1, ground engaging members 16 are tires, but in other embodiments may include other means of propelling the utility vehicle 10 such as tracks. Prime mover 376 develops the motive power that is then distributed to one or more of the ground engaging members 16. In the embodiment shown in FIG. 1, prime mover 376 is located in the rear of the vehicle. In particular, in some embodiments prime mover 376 is located between the rear axle (not shown in FIG. 1) associated with rearmost ground engaging members and intermediate axle (not shown in FIG. 1) associated with intermediate ground engaging members.

Cab area 20 includes one or more seats 22 and steering wheel 24. In some embodiments, a dashboard 26 is located in front of seats 22 and provides one or more instrument panels and/or control elements. For example, as discussed above, in some embodiments one, two, three, four, five or all six of the ground engaging members 16 may be selectively engaged to propel the utility vehicle 10. In addition, in some embodiments differentials associated with each set of wheels—such as the front differential associated with front ground engaging members, intermediate differential associated with intermediate ground engaging members, and rear differential associated with rear ground engaging members—may be selectively locked or selectively opened.

Figure 2:
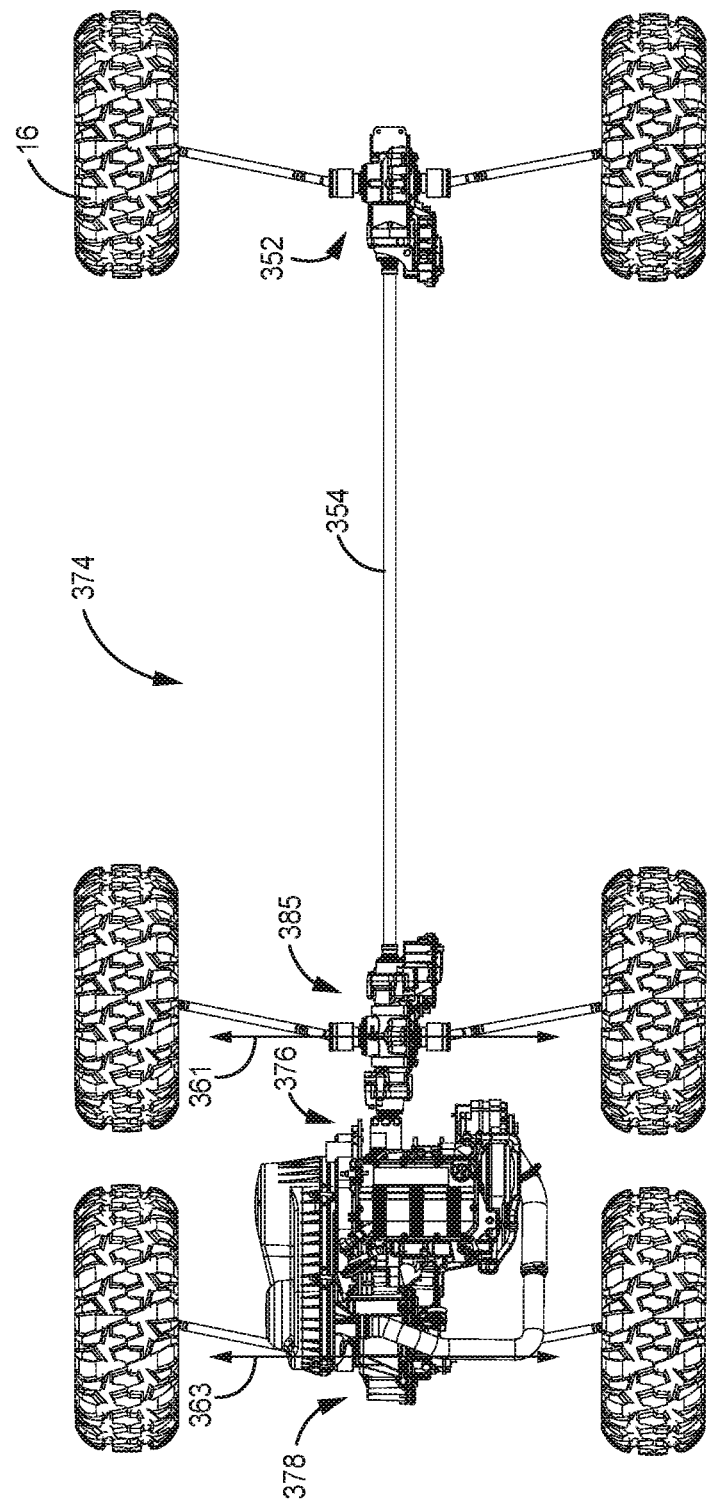
FIG. 2 is a top view of the driveline employed in the off-road utility vehicle according to some embodiments.

Turning to FIGS. 2-4, in some embodiments, a driveline 374 comprises a prime mover 376, transmission 378 (e.g., transaxle which, in some embodiments, includes a rear differential, such as a selectively lockable differential), front drive shaft 354, an intermediate drive shaft 383, an intermediate drive assembly 385, and a front drive assembly 352. In at least some embodiments, the transmission 378 includes one or more forward gears (e.g., high range and low range), neutral, and one or more reverse gears. In some embodiments, the transmission 378 includes a CVT (continuously variable transmission), for example having movable sheaves and a belt. Motive force developed by prime mover 376 is provided to transmission 378. In some embodiments, transmission 378 includes a rear differential that provides motive force to rear ground engaging members. In some embodiments, rear differential is a selectively lockable differential. In addition to providing power to rear ground engaging members, transmission 378 provides motive force to intermediate drive shaft 383, which in turn is connected to intermediate drive assembly 385.

In some embodiments, intermediate drive assembly 385 is connected to receive motive power from transmission 378 via intermediate drive shaft 383. In some embodiments, intermediate drive assembly includes an intermediate differential, such as a selectively lockable differential. When locked, motive force provided to intermediate drive assembly 385 is provided to both the left and right ground engaging members connected to intermediate drive assembly 385. In some embodiments, intermediate drive assembly 385 is controlled to selectively engage front drive shaft 354. When selectively engaged, motive force provided to intermediate drive assembly 385 by intermediate drive shaft 383 is provided to front drive shaft 354. In some embodiments, front drive shaft 354 counter-rotates relative to intermediate drive shaft 383. Front drive assembly 352 is connected to front drive shaft 354, wherein motive force provided to front drive shaft 354 is provided to front ground engaging members. In some embodiments, front drive assembly 352 includes a front differential, such as a selectively lockable differential. When locked, motive force provided to front drive assembly 352 is provided to both the left and right ground engaging members connected to front drive assembly 352.

In some embodiments, motive power developed by prime mover 376 may be selectively outputted from intermediate drive assembly 385, and if outputted from the intermediate drive assembly, power may be selectively outputted from the front drive assembly 352. As a result, motive power developed by prime mover 376 may be selectively provided to the rear wheels only, both the rear wheels and the intermediate wheels, or the rear wheels, the intermediate wheels, and the front wheels. In addition, in some embodiments each of the rear drive assembly (which may be included as part of the transmission 378), the intermediate drive assembly 385, and the front drive assembly 352 may include differentials that are selectively lockable.

Figure 5:
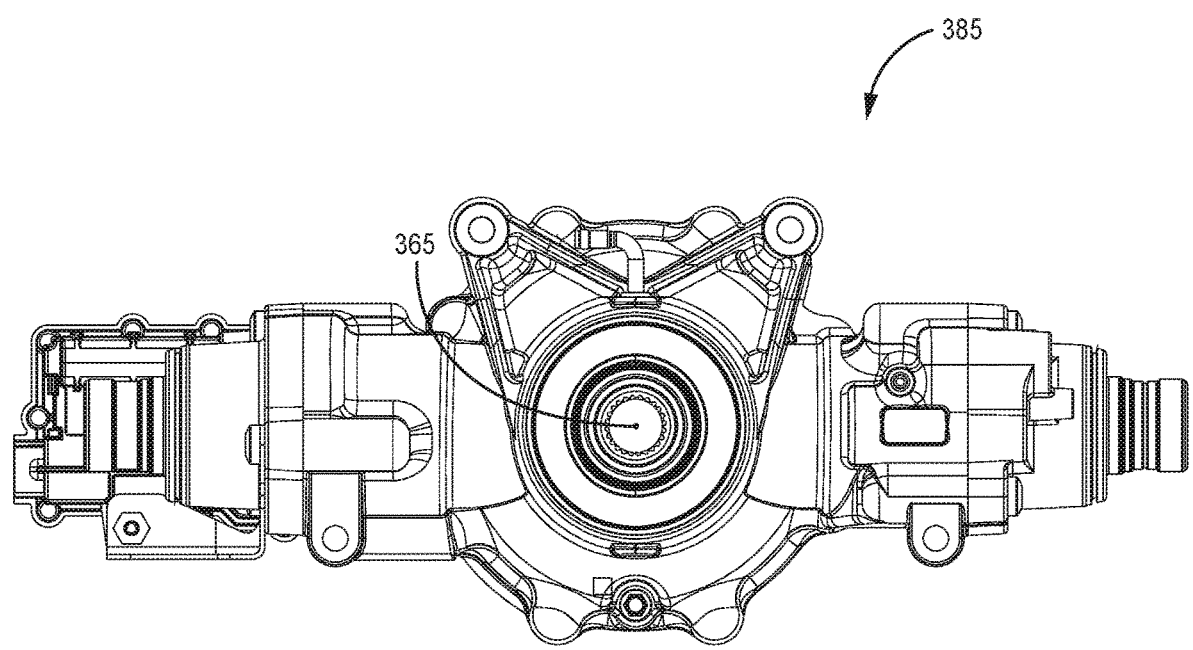
FIGS. 5 and 6 are first and second side view of the differential utilized in the driveline according to some embodiments.
Figure 6:
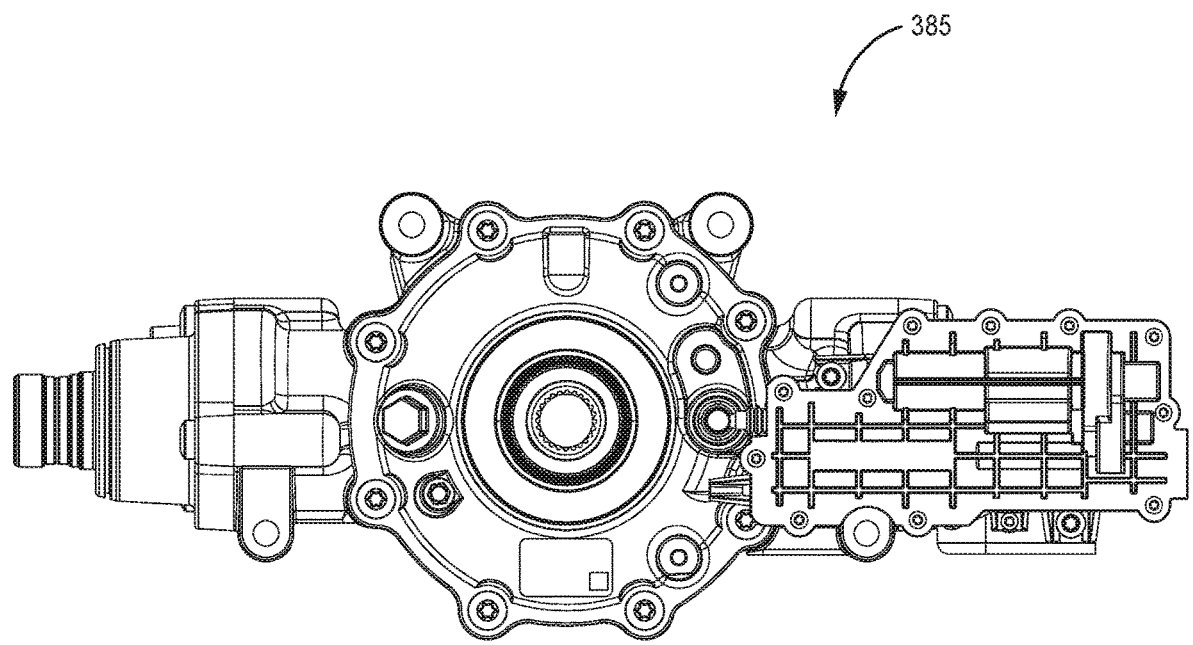
Figure 7:
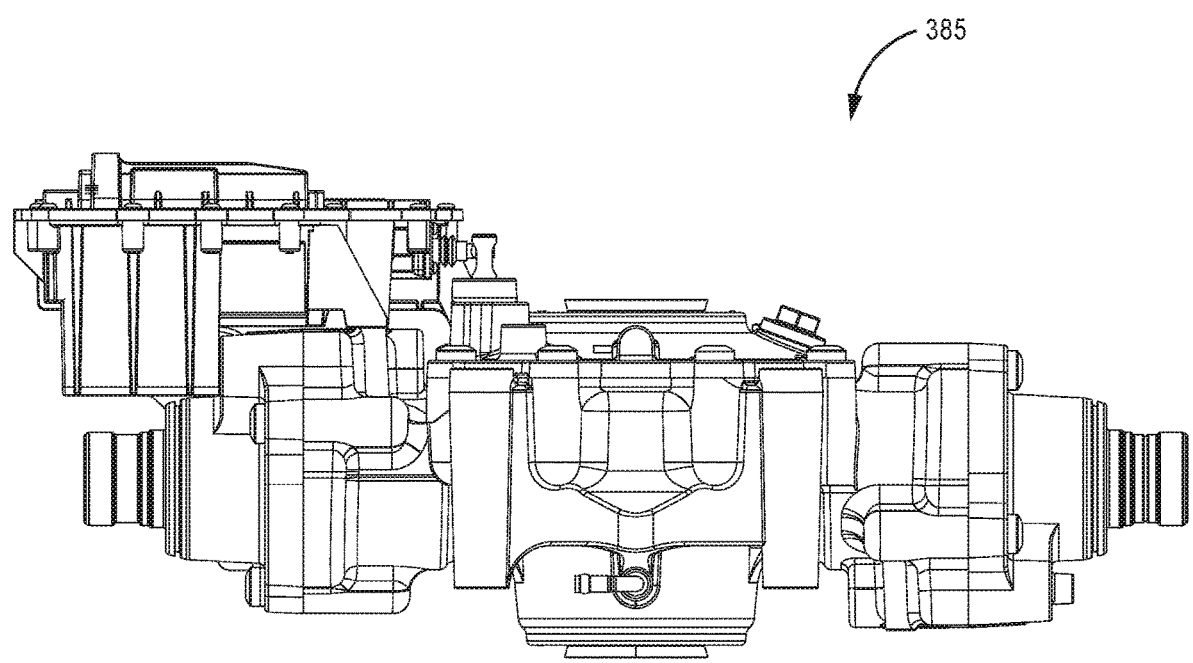
FIG. 7 is a top view of the differential utilized in the driveline according to some embodiments.

As further shown in FIGS. 1-4, in some embodiments, the prime mover 376 is located below the cargo box 18, which can tilt, for example to dump cargo. As shown in FIG. 2, in some embodiments, the prime mover 376 is located between rear drive vertical plane 363 and intermediate drive vertical plane 361. Vertical plane 361 is defined by the centerline 365 (FIGS. 3-5) of the wheel drive output of the intermediate drive assembly 385. Further, vertical plane 363 is defined by the centerline 367 of the wheel drive output of the transmission 378. In some embodiments, the prime mover 376 includes an oil pan 400 (FIG. 4). As shown in FIG. 4, in some embodiments, at least a portion of the intermediate drive shaft 383 is located laterally between the oil pan 400 and one or more CVT covers.

Figure 8:
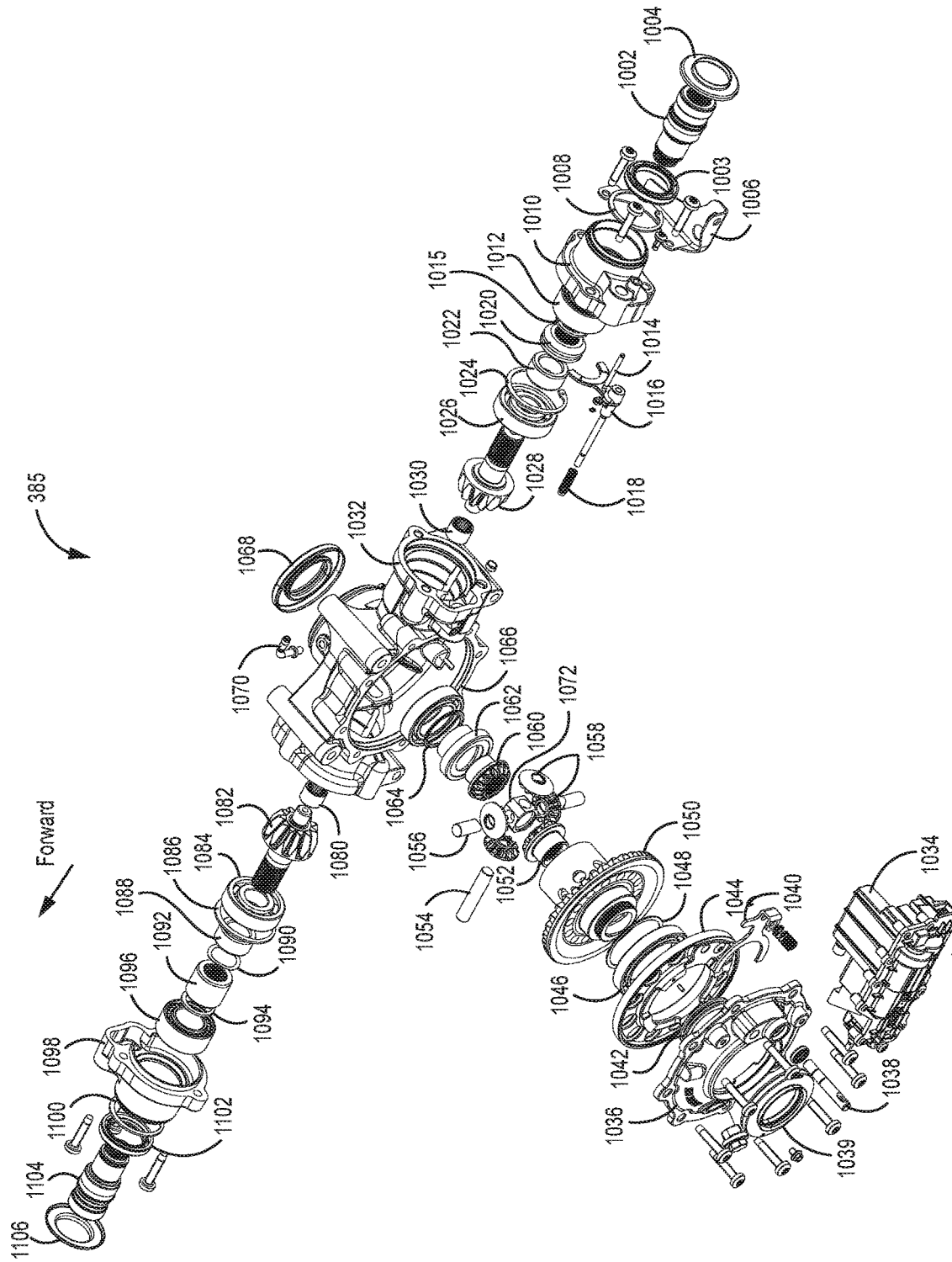
FIG. 8 is a forward-looking exploded view of the differential utilized in the driveline according to some embodiments.
Figure 9:
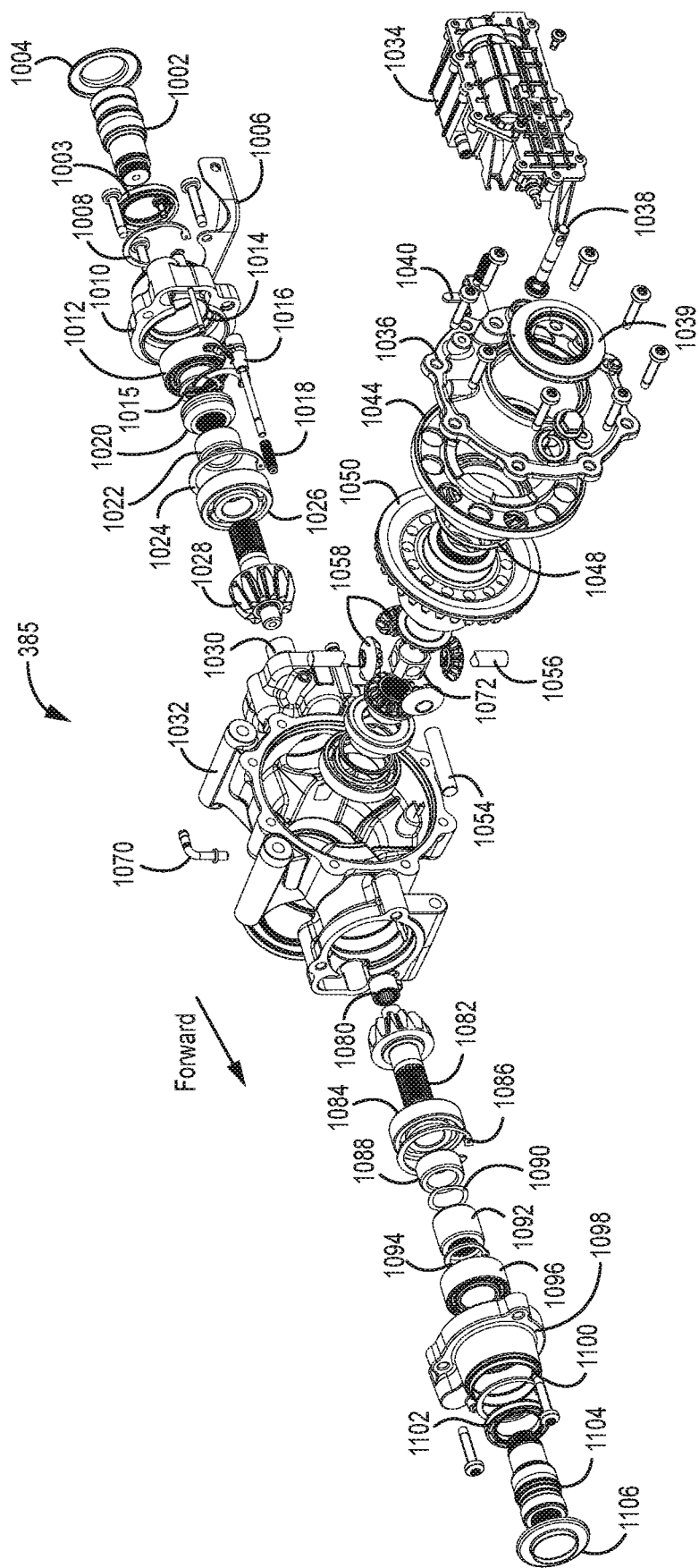
FIG. 9 is a rearward-looking exploded view of the differential utilized in the driveline according to some embodiments.

With regard to FIGS. 5-7, 10, 12, 14, 16, and 18 various views of an embodiment of the intermediate drive assembly 385 are shown. FIGS. 8 and 9 show exploded views of an embodiment of the intermediate drive assembly 385. FIGS. 11, 13, 15, 17, and 19 show various cross-sectional views of an embodiment of the intermediate drive assembly 385.

Turning to FIGS. 8 and 9, in some embodiments, the intermediate drive assembly 385 comprises one or more of the following: input shaft 1002, input shaft seal 1003, annular input shaft cover 1004, mount 1006, input shaft bearing retainer 1008, input shaft housing 1010, input shaft bearing 1012, drive selector pushrod 1014, input shaft retainer 1015, drive selector fork assembly 1016, selector return spring 1018, drive coupler 1020, retaining collar 1022, inner bearing retainer 1024, input pinion spline bearing 1026, input pinion 1028, input pinion shaft bearing 1030, main housing 1032, actuator assembly 1034, cover 1036, lock selector pushrod 1038, cover seal 1039, lock selector fork assembly 1040, lock collar 1042, flange bearing 1046, shim 1048, ring gear 1050, first driving gear 1052, first spider gear shaft 1054, second spider gear shaft 1056, spider gear 1058, second driving gear 1060, gear cap 1062, shim 1064, gear cap bearing 1066, gear case seal 1068, gear case vent 1070, shaft retainer 1072, output pinion shaft bearing 1080, output pinion 1082, output pinion spline bearing 1084, inner bearing retainer 1086, retaining collar 1088, spring washer 1090, coupling collar 1092, output shaft retainer 1094, output shaft bearing 1096, output shaft housing 1098, output shaft bearing retainer 1100, output shaft seal 1102, output shaft 1104, and annular output shaft cover 1106.

In the embodiment shown in FIGS. 8 and 9, input shaft 1002 is coupled to transmission 378 (shown in FIG. 3). Input shaft 1002 is selectively coupled to input pinion 1028 to provide motive force to intermediate drive assembly 385 via selective engagement of drive selector fork assembly 1016 and drive coupler 1020. When drive selector fork assembly 1016 is engaged, motive force is communicated from input shaft 1002 to input pinion 1028. In some embodiments, input pinion 1028 includes spur and/or helical type gear teeth that engage with the teeth of ring gear 1050, causing ring gear 1050 to rotate about an axis perpendicular with the axis of rotation associated with input pinion 1028, wherein ring gear 1050 communicates motive force to the left and right intermediate wheels. In addition, motive force provided to ring gear 1050 is communicated to output pinion 1082, which is coupled to output shaft 1104 extending toward front drive assembly 352.

In the embodiment shown in FIGS. 8 and 9, intermediate drive assembly 385 includes a selectively lockable intermediate differential that, in some embodiments, includes first driving gear 1052, first spider gear shaft 1054, second spider gear shaft 1056, spider gear 1058, and second driving gear 1060. When in an open state, the first driving gear 1052 is allowed to rotate at a different rotational velocity than second driving gear 1060. Intermediate differential is selectively locked via engagement of lock selector fork assembly 1040 and lock collar 1042. In particular, lock selector fork assembly 1040 slides lock collar 1042 towards the differential to lock the differential, thereby preventing the first driving gear 1052 from rotating at a different rate than second drive gear 1060. In some embodiments, actuator assembly 1034 receives inputs and generates motive force that selectively engages drive selector fork assembly 1016 and lock selector fork assembly 1040.

In some embodiments, actuation of actuator assembly 1034 may be controlled by one or more cables or a like feature, such as an electronic solenoid that moves drive selector fork assembly 1016 in a direction parallel with the axis of input shaft 1002. Similarly, actuator assembly 1034 may be controlled to move lock selector fork assembly 1040 to selectively lock the intermediate differential. In this way, intermediate drive assembly 385 can be selectively engaged to receive motive force and provide it to the left and right intermediate wheels, and in addition may be selectively locked to ensure power is provided to both the left and the right intermediate wheels.

Figure 12:
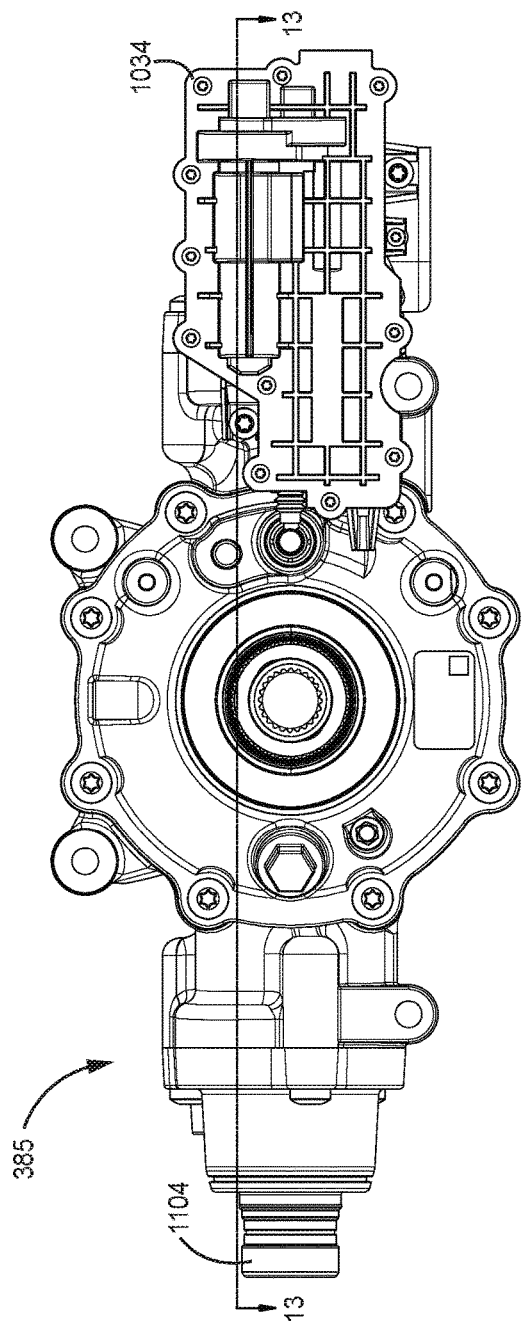
FIG. 12 is a side view of the differential according to some embodiments.
Figure 13:
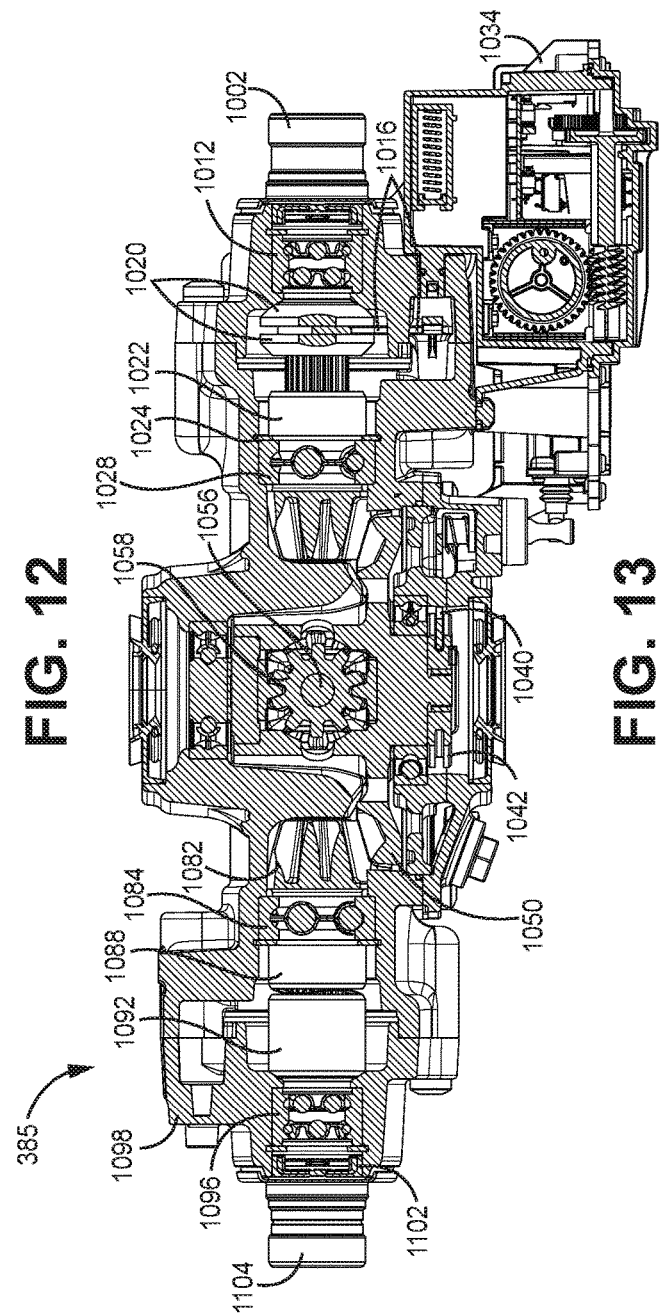
FIG. 13 is a cross-sectional view of the differential taken along line 13-13 shown in FIG. 12 according to some embodiments.

FIG. 10 is a top view of the intermediate drive assembly 385. FIG. 11 is a cross-sectional view of intermediate drive assembly 385 taken along line 11-11. In the embodiment shown in FIG. 11, drive coupler 1020 can be selectively engaged and disengaged, wherein when engaged motive force provided at input shaft 1002 is communicated to intermediate drive assembly 385 and to the left and right intermediate wheels. Drive selector fork assembly 1016 is utilized to selectively move drive coupler 1020 between the engaged state (to the right of the page) and the disengaged state (toward the left), as indicated by the arrows. When engaged, drive coupler 1020 overlaps the outer surfaces associated with both a portion of input shaft 1002 and the shaft of pinion gear 1028, causing motive force to be transferred between the two. FIG. 12 is a side view of the intermediate drive assembly 385. FIG. 13 is a cross-sectional view of intermediate drive assembly 385 taken along line 13-13. In the view shown in FIG. 13, illustrates how drive selector fork assembly 1016 is connected to drive coupler 1020 and actuated by actuator assembly 1034 to slide drive coupler 1020 between the engaged and disengaged positions. In addition, in the embodiment shown in FIG. 13, the teeth of input pinion gear 1028 are in engagement with the teeth of ring gear 1050, which in turn are in engagement with the teeth of output pinion gear 1082. Motive force provided to input pinion gear 1028 is communicated to output pinion gear 1082 via ring gear 1050. In this embodiment, input pinion gear 1028 would rotate in a direction opposite to that of output pinion gear 1082.

FIG. 13 also illustrates lock collar 1042 selectively actuated by lock selector fork assembly 1040, wherein lock collar 1042 is moved toward spider gears 1058 associated with the intermediate differential to lock the differential and in the opposite direction to open the differential.

Figure 14:
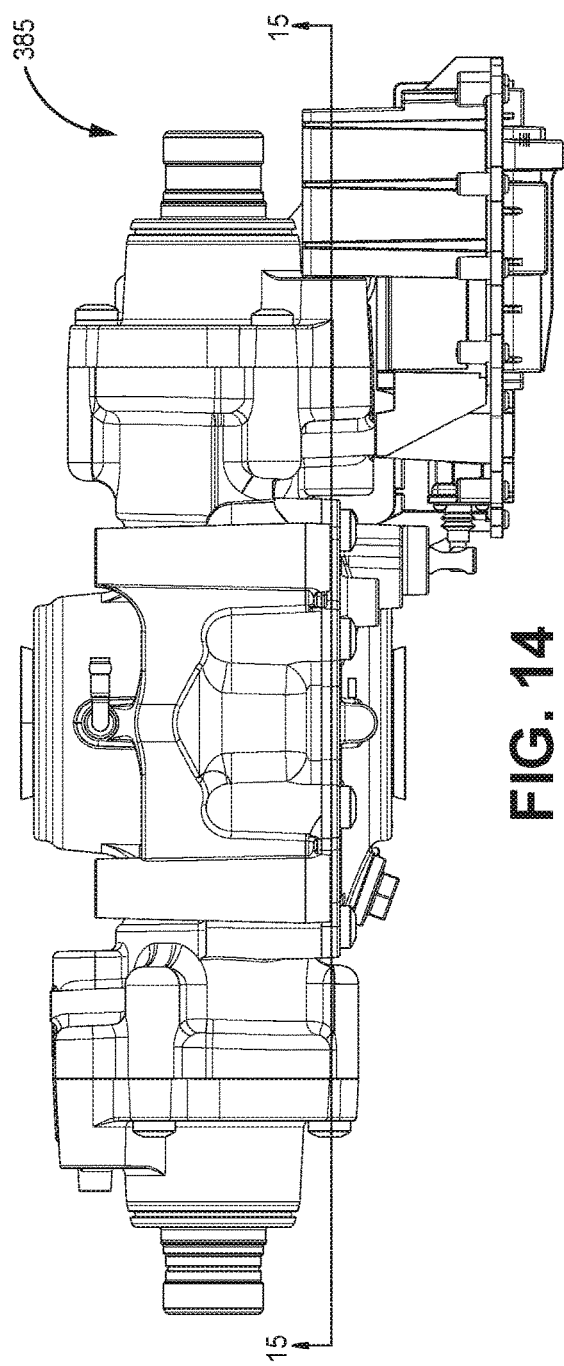
FIG. 14 is a top view of the differential according to some embodiments.
Figure 15:
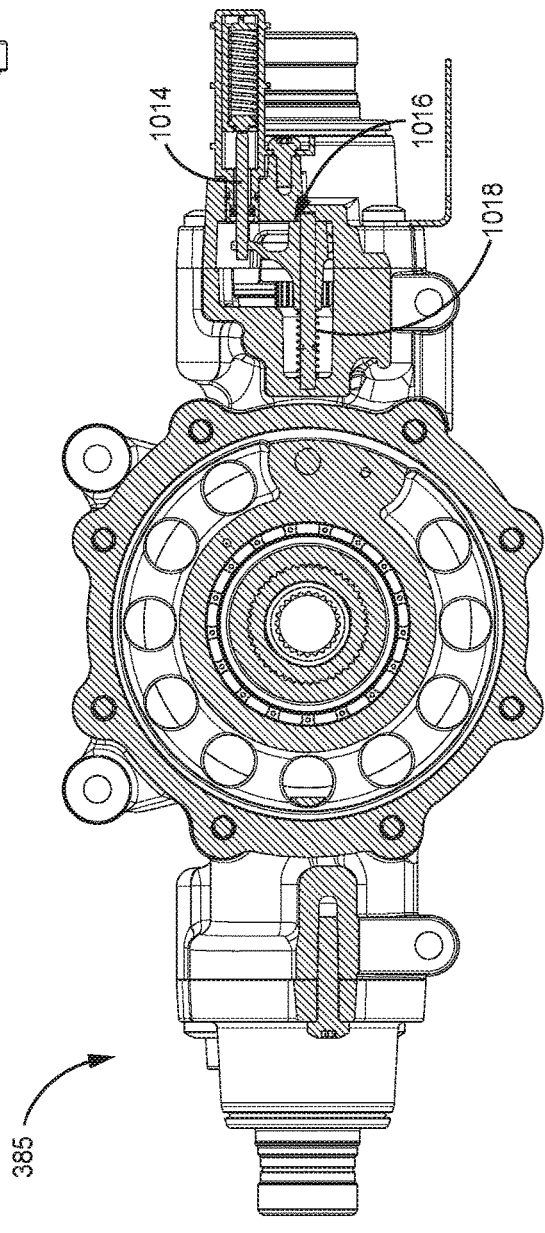
FIG. 15 is a cross-sectional view of the differential taken along line 15-15 shown in FIG. 14 according to some embodiments.

FIG. 14 is a top view of the intermediate drive assembly 385. FIG. 15 is a cross-sectional view of intermediate drive assembly 385 taken along line 15-15. In the embodiment shown in FIG. 15, drive selector fork assembly 1016 is visible, along with drive selector push-rod 1014 and selector return spring 1018.

Figure 16:
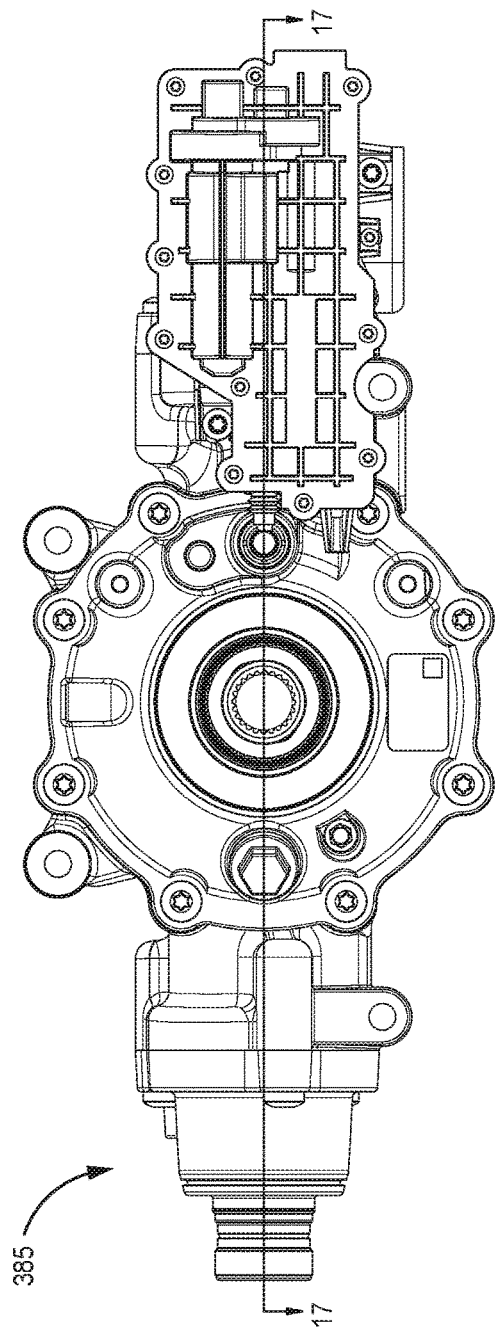
FIG. 16 is a side view of the differential according to some embodiments.
Figure 17:
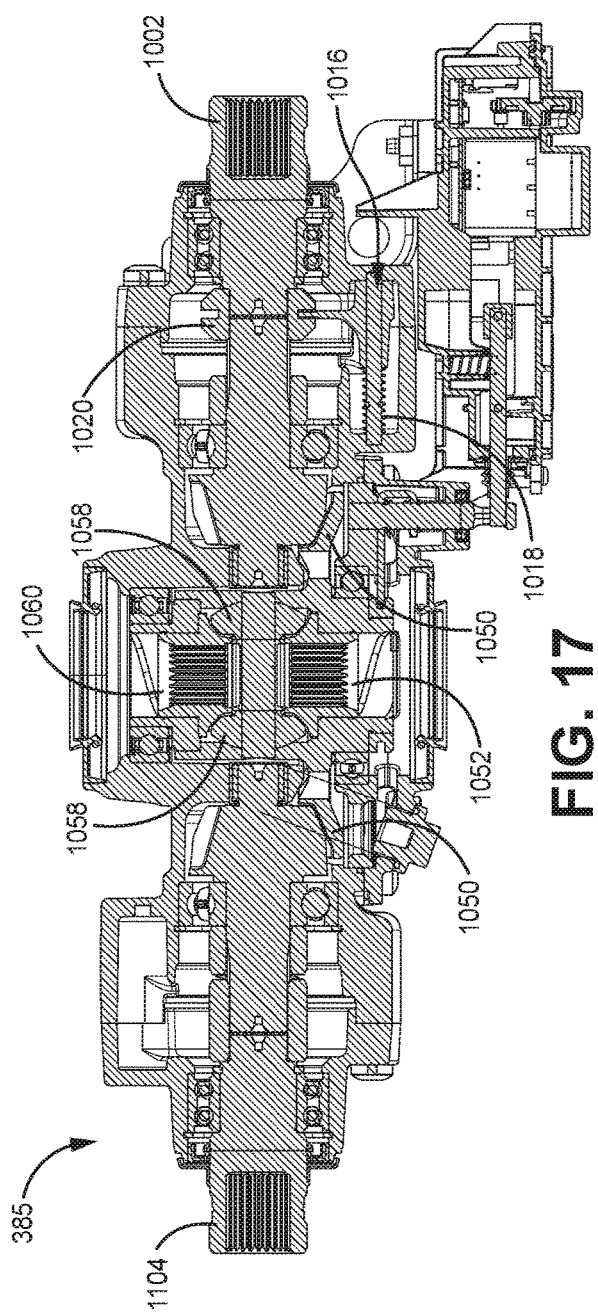
FIG. 17 is a cross-sectional view of the differential taken along line 17-17 shown in FIG. 16 according to some embodiments.

FIG. 16 is a side view of the intermediate drive assembly 385. FIG. 17 is a cross-sectional view of intermediate drive assembly 385 taken along line 17-17. In the embodiment shown in 17, the engagement between first driving gear 1052 and spider gears 1058, as well as between second driving gear and spider gears 1058 allows for different speeds to be developed at the first driving gear 1054 and the second driving gear 1060 (e.g., differential operation).

Figure 18:
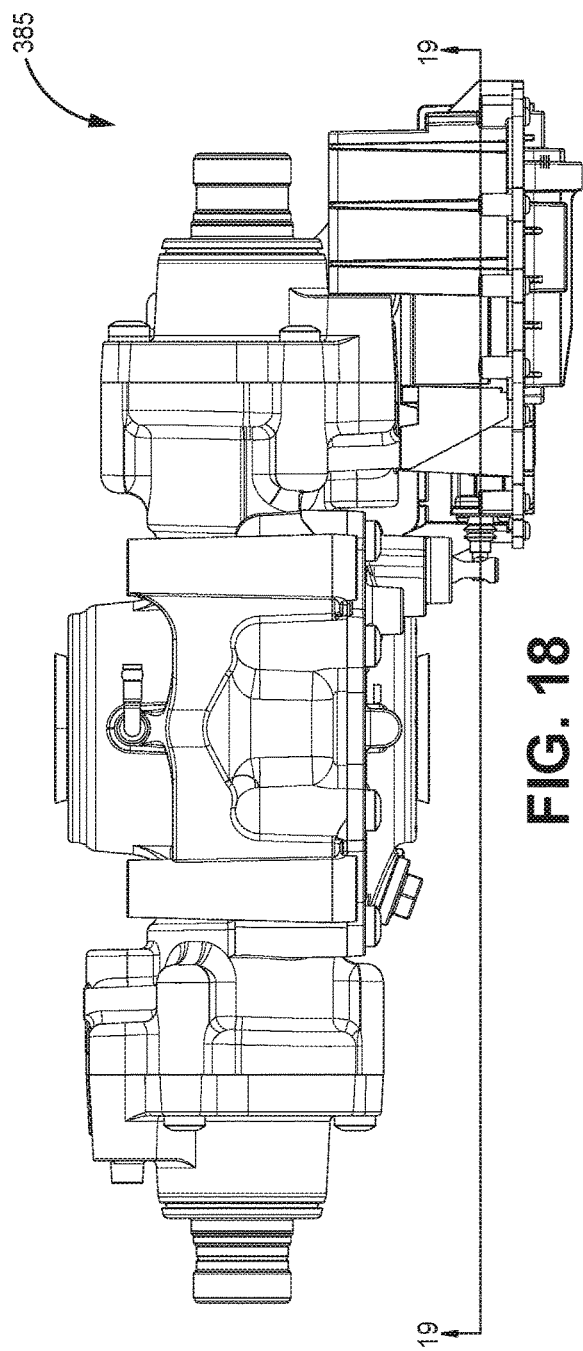
FIG. 18 is a top view of the differential according to some embodiments.
Figure 19:
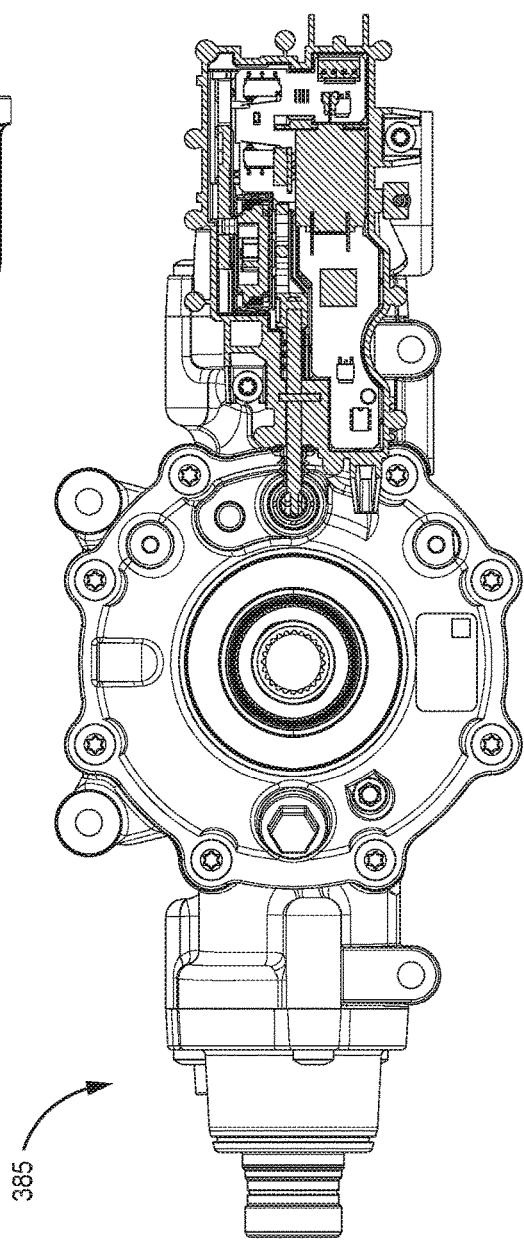
FIG. 19 is a cross-sectional view of the differential taken along line 19-19 shown in FIG. 18 according to some embodiments.

FIG. 18 is a top view of the intermediate drive assembly 385. FIG. 19 is a cross-sectional view of intermediate drive assembly 385 taken along line 19-19.

As discussed above, in some embodiments, the intermediate drive assembly 385 includes a locking differential. Further, in some embodiments, the transmission 378 includes a locking differential. And, in some embodiments, the front drive assembly 352 includes a locking differential. Locking of the lock in a respective differential fixes together the rotation of the wheels associated with that differential. In some embodiments, the driveline 374 includes differentials between transmission 378 (e.g., transaxle) and the intermediate drive assembly 385 and/or the intermediate drive assembly 385 and the front drive assembly 352; such differential(s) can also be employed with lockers, as desired.

In some embodiments, an operator can select a variety of drive modes, for example as shown below in the following table, via DM ("Drive Mode") DM1-DMXIV:

|  | Engaged | Locked |
|---|---|---|
| DM I |  |  |
| Rear | x |  |
| Intermediate |  |  |
| Front |  |  |
| DM II |  |  |
| Rear | x | X |
| Intermediate |  |  |
| Front |  |  |
| DM III |  |  |
| Rear | x |  |
| Intermediate | x |  |
| Front |  |  |
| DM IV |  |  |
| Rear | x | X |
| Intermediate | x |  |
| Front |  |  |
| DM V |  |  |
| Rear | x | X |
| Intermediate | x | X |
| Front |  |  |
| DM VI |  |  |
| Rear | x |  |
| Intermediate | x | X |
| Front |  |  |
| DM VII |  |  |
| Rear | x |  |
| Intermediate | x |  |
| Front | x |  |
| DM VIII |  |  |
| Rear | x | X |
| Intermediate | x |  |
| Front | x |  |
| DM IX |  |  |
| Rear | x | X |
| Intermediate | x | X |
| Front | x |  |
| DM X |  |  |
| Rear | x | X |
| Intermediate | x | X |
| Front | x | X |
| DM XI |  |  |
| Rear | x |  |
| Intermediate | x | X |
| Front | x |  |

-continued

|  | Engaged | Locked |
|---|---|---|
| DM XII |  |  |
| Rear | x |  |
| Intermediate | x |  |
| Front | x | X |
| DM XIII |  |  |
| Rear | x |  |
| Intermediate | x | X |
| Front | x | X |
| DM XIV |  |  |
| Rear | x | X |
| Intermediate | x |  |
| Front | x | X |

Figure 20:
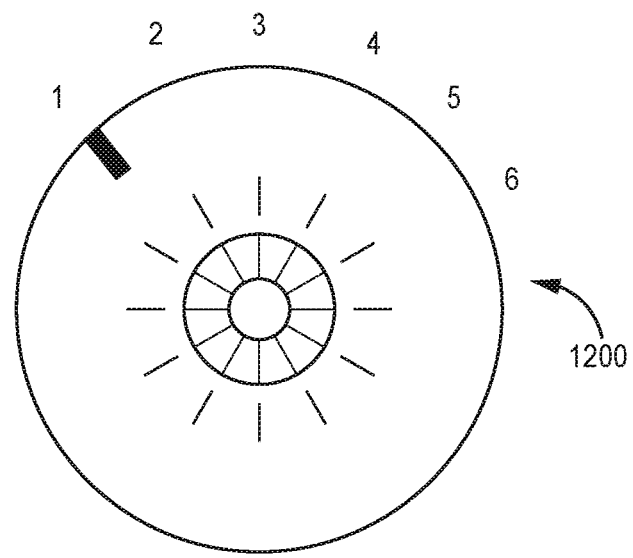
FIG. 20 is a setting selector provided on the dashboard of the off-road utility vehicle to allow an operator to switch between a plurality of different settings.

With regard to FIG. 20, in some embodiments, an operator can select the desired Drive Mode via a rotary selector 1200. By way of example only, in some embodiments, the rotary selector has six positions, where position 1 is indicative of DM I, position 2 is indicative of DM III, position 3 is indicative of DM VII, position 4 is indicative of DM VIII, position 5 is indicative of DM IX, and position 6 is indicative of DM X, however any other arrangement of Drive Modes, number of selections (e.g., 3, 4, 5, 6, 7, 8, 9, 10, 11, 12, 13, 14), order of selections, etc., can be implemented. In other embodiments, an operator can individually select whether one or more of the rear, intermediate and/or front drive assemblies are engaged, and separately selects whether one or more of the locking differentials associated with the rear, intermediate, and/or front drive assemblies are engaged.

Figure 21:
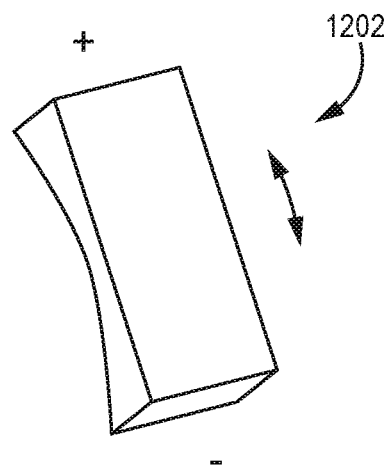
FIG. 21 is a rocker switch provided within the cab of the off-road utility vehicle to allow an operator to switch between two or more different settings.

Further, with regard to FIG. 21, in some embodiments, the operator can select a desired Drive Mode via rocker switch 1202, such as a momentary rocker switch which automatically returns to a neutral position. By way of example only, where the vehicle is in DM I, in some embodiments, the operator can push the rocker switch in the "+" direction, and the vehicle will move to DM II (or DM III or DM VII, etc.) to increase the number of driving wheels. Thereafter, the operator, can push the "+" an additional time to move to DM V (or DM XIV, etc.) in order to again increase the number of driving wheels. With further regard to FIG. 21, if the operator desires to reduce the number of driving wheels, the "−" selection can be made to move to a Drive Mode with few drive wheels. The specific Drive Mode selection with each consecutive "+" (or "−") can be programmed by an operator, for example via an ECU, and/or, can be made by the factory, and/or modified by In some embodiments, the operator can select the Drive Mode via a touch screen, push button interface, etc. on the dash of the vehicle, on handlebars of the vehicle, etc.

In some embodiments, the operator can select the Drive Mode via multiple switches, for example one switch that controls locking one or more of the differentials and another switch that controls engagement of the drive assembly. Further, in some embodiments, an array of switches can be used to control locking and/or engagement of one or more of the drive assemblies. Further still, in some embodiments, a particular Drive Mode may be associated with a Condition Mode, which can be operator selector. The Condition Mode can be, for example: snow, sand, gravel, rock, rough terrain, etc. In addition to configuring the Drive Mode, the Condition mode can also change the characteristics of the engine (e.g., maximum torque, fuel economy, etc.), characteristics of the CVT clutching (e.g., electronic clutching to engage at a higher or lower RPM, etc.), characteristics of the suspension (increase/decrease articulation, increase/decrease body roll, increase/decrease anti-roll bar input, etc.).

In some embodiments, the electronic logic (whether software or hardware) will not permit the operator to engage the lock associated with any drive until that drive has been selected. Stated differently, in some embodiments, the operator will not be allowed to lock the intermediate drive assembly 385 until the intermediate drive assembly 385 is engaged. Further, in some embodiments, the operator will not be allowed to lock the front drive assembly 352 until the front drive assembly 352 is engaged.

In some embodiments, when the intermediate drive shaft 383 is being driven (e.g., the drive coupler 1020 couples the input pinion 1028 and the input shaft 1002), the front drive shaft 354 rotates. Moreover, in some embodiments, the front drive shaft 354 rotates in a direction opposite the intermediate drive shaft 383. In other words, in some embodiments, the intermediate drive shaft 383 and the front drive shaft 354 are counter-rotating.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

What is claimed is:
1. An off-road utility vehicle comprising:
a frame;
an engine;
a continuously variable transmission;
a transaxle comprising a rear differential;
an intermediate drive assembly comprising an intermediate differential; and
a front drive assembly comprising a front differential, wherein the intermediate drive assembly and transaxle are coupled via an intermediate driveshaft and the front drive assembly and the intermediate drive assembly are coupled via a front drive shaft, wherein the front drive shaft and the intermediate driveshaft are inline and counter rotating, wherein the intermediate drive assembly is selectively engaged to communicate motive force received from the intermediate driveshaft to intermediate axles coupled to the intermediate differential, wherein the front drive assembly is selectively engaged to communicate motive force received from the front drive shaft to front axles coupled to the front differential, wherein in a first mode motive force developed by the engine is provided only to the transaxle and the rear differential, wherein in a second mode motive force developed by the engine is provided to the transaxle and the rear differential and to the intermediate drive assembly and the intermediate differential, wherein in a third mode motive force developed by the engine is provided to the transaxle and corresponding rear differential, the intermediate drive assembly and corresponding intermediate differential, and the front drive assembly and corresponding front differential.

2. The off-road utility vehicle of claim 1, further including:
rear axles coupled to the rear differential and to rear ground engaging members;
wherein the intermediate axles are coupled to the intermediate differential and to intermediate ground engaging members; and
wherein the front axles are coupled to the front differential and to front ground engaging members.

3. The off-road utility vehicle of claim 2, wherein the rear ground engaging members, intermediate ground engaging members, and front ground engaging members are tires.

4. The off-road utility vehicle of claim 1, wherein one or more of the rear differential, the intermediate differential, and the front differential is selectively lockable.

5. The off-road utility vehicle of claim 4, further comprising:
a cab area including one or more seats; and
a dashboard located within the cab area, wherein the dashboard includes one or more controls to allow an operator to selectively engage the intermediate drive assembly, the front drive assembly, and selectively lock the rear differential, the intermediate differential, and the front differential.

6. The off-road utility vehicle of claim 1, further comprising:
a cab area including one or more seats; and
a dashboard located within the cab area, wherein the dashboard includes one or more controls to allow an operator to select between the first mode, the second mode, and the third mode.

7. The off-road utility vehicle of claim 1, wherein the engine is located between the transaxle and the intermediate drive assembly.

8. An off-road utility vehicle comprising:
a frame;
a cargo box;
an engine, wherein the engine is located beneath the cargo box;
a continuously variable transmission;
a transaxle comprising a rear differential;
an intermediate drive assembly comprising an intermediate differential; and
a front drive assembly comprising a front differential, wherein the intermediate drive assembly and transaxle are coupled via an intermediate driveshaft and the front drive assembly and the intermediate drive assembly are coupled via a front drive shaft, wherein the engine is located between the transaxle and the intermediate drive assembly, wherein in a first mode motive force developed by the engine is provided only to the transaxle and the rear differential, wherein in a second mode motive force developed by the engine is provided to the transaxle and the rear differential and to the intermediate drive assembly and the intermediate differential, wherein in a third mode motive force developed by the engine is provided to the transaxle and corresponding rear differential, the intermediate drive assembly and corresponding intermediate differential, and the front drive assembly and corresponding front differential.

9. The off-road utility vehicle of claim 8,
rear axles coupled to the rear differential and to rear ground engaging members;
intermediate axles coupled to the intermediate differential and to intermediate ground engaging members; and
front axles coupled to the front differential and to front ground engaging members.

10. The off-road utility vehicle of claim 9, wherein the rear ground engaging members, intermediate ground engaging members, and front ground engaging members are tires.

11. The off-road utility vehicle of claim 9, wherein the intermediate drive assembly is selectively engaged to communicate motive force received from the intermediate driveshaft to the intermediate axles.

12. The off-road utility vehicle of claim 11, wherein the front drive assembly is selectively engaged to communicate motive force received from the front drive shaft to the front axles.

13. The off-road utility vehicle of claim 12, wherein one or more of the rear differential, the intermediate differential, and the front differential is selectively lockable.

14. The off-road utility vehicle of claim 13, further comprising:
a cab area including one or more seats; and
a dashboard located within the cab area, wherein the dashboard includes one or more controls to allow an operator to selectively engage the intermediate drive assembly, the front drive assembly, and selectively lock the rear differential, the intermediate differential, and the front differential.

15. The off-road utility vehicle of claim 8, further comprising:
a cab area including one or more seats; and
a dashboard located within the cab area, wherein the dashboard includes one or more controls to allow an operator to select between the first mode, the second mode, and the third mode.

16. The off-road utility vehicle of claim 8, wherein the front drive shaft and the intermediate drive shaft are counter rotating.

17. An off-road utility vehicle comprising:
a frame;
an engine;
a continuously variable transmission;
a transaxle comprising a rear differential;
an intermediate drive assembly comprising an intermediate differential; and
a front drive assembly comprising a front differential, wherein the intermediate drive assembly and transaxle are coupled via an intermediate driveshaft and the front drive assembly and the intermediate drive assembly are coupled via a front drive shaft, wherein the front drive shaft and the intermediate drive shaft are counter rotating, wherein in a first mode motive force developed by the engine is provided only to the transaxle and the rear differential, wherein in a second mode motive force developed by the engine is provided to the transaxle and the rear differential and to the intermediate drive assembly and the intermediate differential, wherein in a third mode motive force developed by the engine is provided to the transaxle and corresponding rear differential, the intermediate drive assembly and corresponding intermediate differential, and the front drive assembly and corresponding front differential.

* * * * *